US008270187B2

(12) United States Patent
Nakamoto et al.

(10) Patent No.: US 8,270,187 B2
(45) Date of Patent: Sep. 18, 2012

(54) ELECTRIC POWER SUPPLY CIRCUIT WITH PAM WAVEFORM CORRECTION

(75) Inventors: Ryou Nakamoto, Osaka (JP); Masafumi Hashimoto, Osaka (JP); Keisuke Shimatani, Osaka (JP); Keiichi Yoshisaka, Osaka (JP); Masakazu Katou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 365 days.

(21) Appl. No.: 12/593,776

(22) PCT Filed: Mar. 18, 2008

(86) PCT No.: PCT/JP2008/000638
§ 371 (c)(1),
(2), (4) Date: Sep. 29, 2009

(87) PCT Pub. No.: WO2008/129798
PCT Pub. Date: Oct. 30, 2008

(65) Prior Publication Data
US 2010/0061128 A1    Mar. 11, 2010

(30) Foreign Application Priority Data

Mar. 30, 2007    (JP) .................................. 2007-094126

(51) Int. Cl.
H02M 1/12    (2006.01)
H02M 1/14    (2006.01)
H02M 3/18    (2006.01)
H02M 7/00    (2006.01)

(52) U.S. Cl. ............................. 363/44; 363/61; 363/125

(58) Field of Classification Search .............. 363/44–48, 363/61, 84, 89, 90, 125–127, 142, 143
See application file for complete search history.

(56) References Cited

U.S. PATENT DOCUMENTS 7,580,272 B2 *    8/2009    Taguchi et al. ................. 363/89
2008/0130336 A1 *    6/2008    Taguchi ........................ 363/125

FOREIGN PATENT DOCUMENTS

| JP | 4-165954 A | 6/1992 |
|---|---|---|
| JP | 11-41935 A | 2/1999 |
| JP | 11-41936 A | 2/1999 |
| JP | 2000-166241 A | 6/2000 |
| JP | 2001-145358 A | 5/2001 |
| JP | 2002-272116 A | 9/2002 |
| JP | 2003-174779 A | 6/2003 |
| JP | 2004-64904 A | 2/2004 |
| JP | 2006-304586 A | 11/2006 |

* cited by examiner

*Primary Examiner* — Adolf Berhane
*Assistant Examiner* — Emily Pham
(74) *Attorney, Agent, or Firm* — Birch, Stewart, Kolasch & Birch, LLP (57) ABSTRACT

An electric power supply circuit includes a switching element (S) for causing a short-circuit for output power of a diode bridge circuit (12), a zero-cross detector section (5a) for detecting a point at which an input voltage reaches a level equal to or lower than a reference level, a timer section (5d) for starting a count upon the detection by the zero-cross detector section (5a), and a PAM waveform output section (5c) for causing the switching element (S) to perform switching with a predetermined output timing so that a waveform of the input current is caused to approximate to a sine wave. The circuit further includes a correction section (5e) for correcting, when a difference between a detection interval from detection to detection by the zero-cross detector section (5a), and an average value for detection intervals up to current detection occurs, an initial value of the count of the timer section (5d) according to the difference.

3 Claims, 6 Drawing Sheets

ELECTRIC POWER SUPPLY CIRCUIT WITH PAM WAVEFORM CORRECTION

TECHNICAL FIELD

The present invention relates to an electric power supply circuit, and more particularly, relates to a technique to increase the accuracy of PAM control.

BACKGROUND ART

Conventionally, power supply apparatuses (electric power supply circuits) for converting alternating current power to direct current power using a rectifier circuit have been known. In a power supply apparatus this type, a high frequency current tends to be generated, resulting in reduction in power supply efficiency. To prevent such reduction in power supply efficiency, for example, Patent Document 1 discloses a power supply apparatus configured to reduce the high frequency current using a so-called PAM (pulse amplitude modulation) control.

Specifically, the power supply apparatus of Patent Document 1 includes a rectifier circuit, which is a diode bridge circuit, and a smoothing circuit. The smoothing circuit includes two capacitors coupled in series with each other, and a single capacitor coupled in parallel with the two capacitors, and is configured to perform double voltage rectification between the smoothing circuit and the rectifier circuit. The power supply apparatus further includes a switching element, provided at an output terminal of the rectifier circuit, for causing, when being turned ON, a short-circuit for output power of the rectifier circuit.

In the power supply apparatus, PAM control is performed. Specifically, in the rectifier circuit, the switching element is switched so that a waveform of an input current approximates to a waveform (a sine wave) of an input voltage. The switching is started at a zero-cross point of an input voltage as a starting point with a predetermined timing. Thus, a desired PAM waveform (pulse signal) is output, and the waveform of the input current approximates to a sine wave. Accordingly, the high frequency current is reduced.

Patent Reference 1: Japanese Published Application No. 2001-145358

DISCLOSURE OF THE INVENTION

Problems which the Invention is to Solve

In the above-described PAM control of Patent Reference 1, a zero-cross point as a starting point of the control has to be detected. Examples of a method for detecting a zero-cross point include a method in which a point (zero-cross point) where the input voltage reaches zero is directly detected and a method in which a point after a lapse of a predetermined time since the input voltage has reached a level equal to or lower than a reference level is detected as a zero-cross point.

However, when distortion and chattering on an input voltage occurs, a zero-point of the input voltage might be shifted or timing with which the input voltage reaches a level equal to or lower than the reference level might be shifted. Thus, disadvantageously, the zero-cross point to be a starting point is shifted, and therefore, a desired PAM waveform cannot be output in a proper manner. As a result, a high frequency current cannot be reliably reduced.

In view of the above-described points, the present invention has been devised, and it is therefore an object of the present invention to reliably generate, in order to cause a waveform of an input current of a rectifier circuit to approximate to a sine wave, a predetermined PAM waveform in an electric power supply circuit in which PAM control is performed based on zero-cross points by correcting, when the zero-cross point is shifted, an output timing of a PAM waveform.

Solution to the Problems

A first aspect of the present invention is directed to an electric power supply circuit including: a rectifier circuit (12), coupled to an alternating current power supply, for rectifying an alternating current; a switching element (S) for causing, when being turned ON, a short-circuit for output power of the rectifier circuit (12); a zero-cross detector section (5a) for detecting a zero-cross point of an input voltage or a point at which the input voltage reaches a level equal to or higher than a predetermined voltage level; and a PAM waveform output section (5c) for outputting, with a predetermined output timing such that the outputting of the pulse signals is started at a time of detection by the zero-cross detector section (5a), a plurality of pulse signals to cause the switching element (S) to perform switching so that a waveform of the input current of the rectifier circuit (12) approximates to a sine wave. An example electric power supply circuit of the first aspect of the present invention further includes a correction section (5e) for correcting the predetermined output timing for the PAM waveform output section (5c) according to a time difference between a detection interval from previous detection to current detection by the zero-cross detector section (5a), and an average value for detection intervals from initial detection to the previous detection by the zero-cross detector section (5a).

According to the first aspect, when the zero-cross detector section (5a) detects the zero-cross point itself, pulse signals are output with the predetermined timing such that the outputting of the pulse signals is started at a time of the detection of the zero-cross point. Thus, a desired PAM waveform is generated based on the zero-cross point. Moreover, when the zero-cross detector section (5a) detects the point at which the input voltage reaches a level equal to or higher than a predetermined voltage level, pulse signals are output with the predetermined timing determined in consideration of a time from a time point of the detection to the zero-cross point, such that the outputting of the pulse signals is started at a time of the detection of the point. Thus, as in the above-described case, a desired PAM waveform is generated based on the zero-cross point. Therefore, the waveform of the input current can be reliably caused to be (to approximate to) a sine wave of the input voltage.

Figure 2:
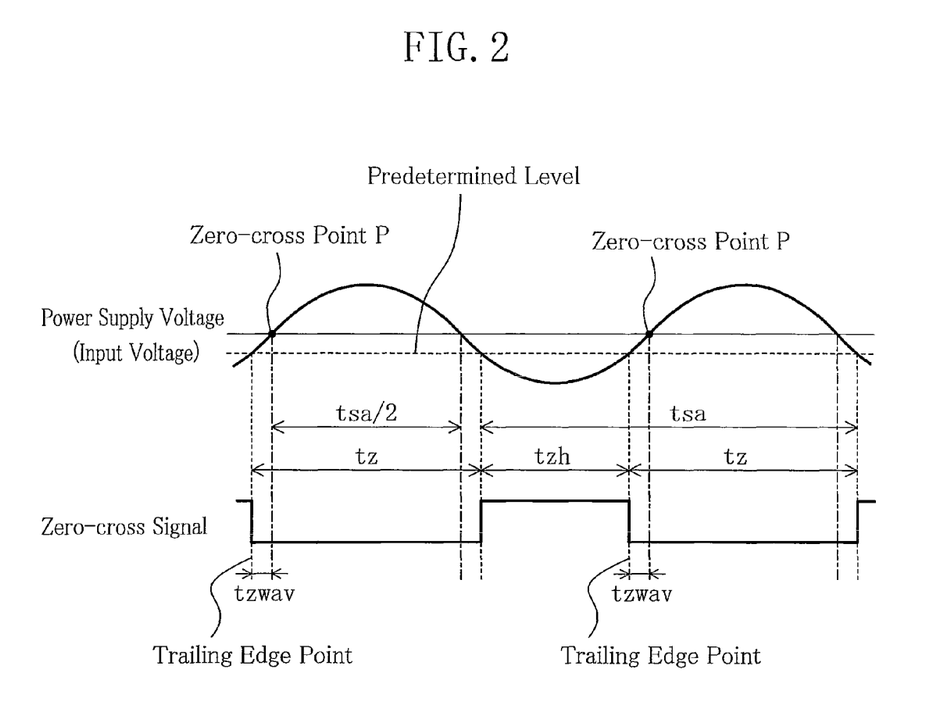
FIG. 2 is a waveform diagram showing the relationship between an input voltage and a zero-cross signal.
Figure 5:
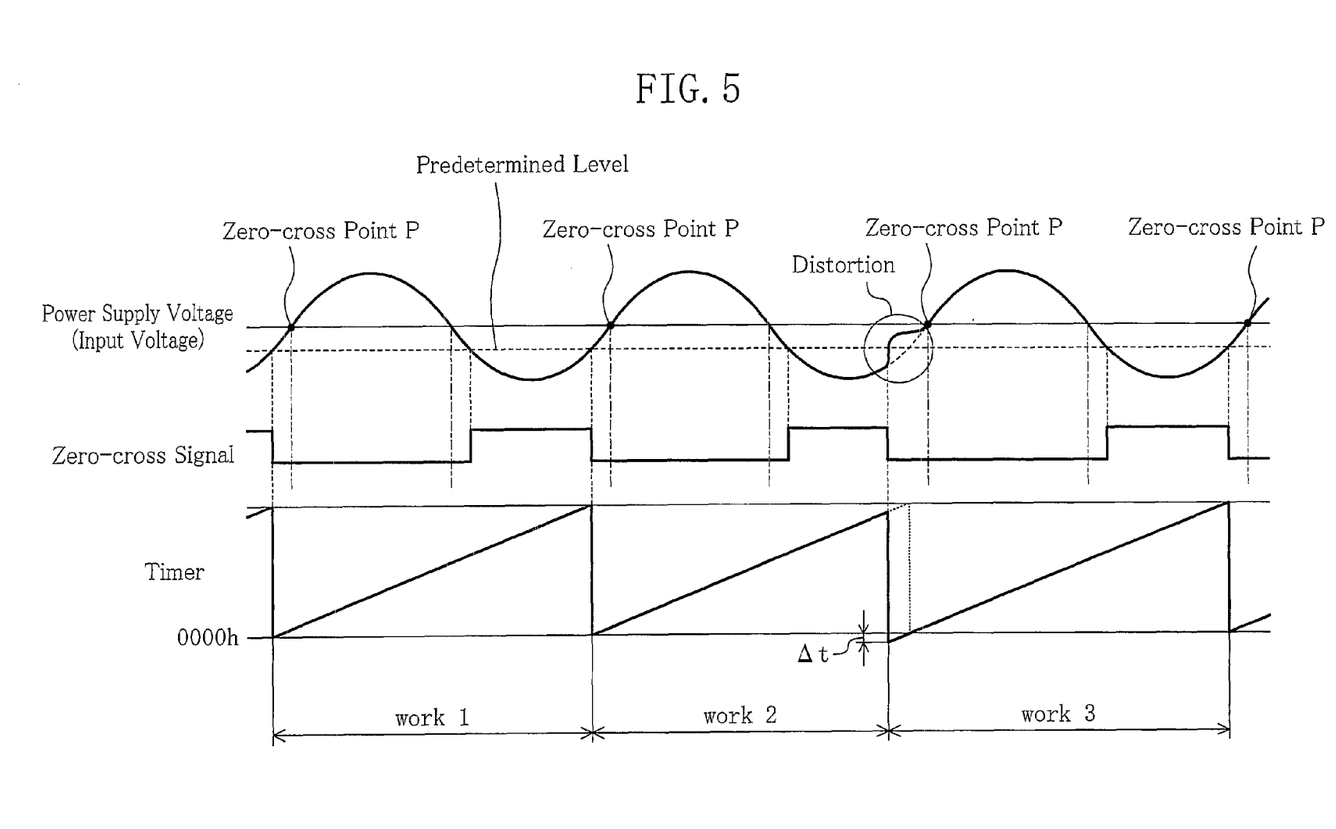
FIG. 5 is a waveform diagram describing a correction operation of correcting an initial value of a timer when distortion on a voltage occurs.

Now, as shown in FIG. 2, a case where the zero-cross detector section (5a) detects a point at which a voltage reaches a level equal to or higher than a reference level (a predetermined voltage level) will be described. As shown in FIG. 5, when distortion on an input voltage occurs and thus a voltage level momentarily exceeds the reference level, the zero-cross detector section (5a) detects the point at which the voltage has reached a level equal to or higher than the reference level. That is, a detection interval from previous detection to current detection by the zero-cross detector section (5a) is shorter than when a normal input voltage is applied. If this state remains unchanged, the PAM waveform output section (5c) outputs a pulse signal earlier than when a normal input voltage is applied. Accordingly, a PAM waveform is shifted from a desired state, so that the waveform of the input current is deformed.

However, according to the first aspect of the present invention, the predetermined output timing of the PAM waveform is corrected according to a time difference between a detection interval from previous detection to current detection by the zero-cross detector section (5a), and an average value for detection intervals from initial detection to the previous detection. That is, in the above described case, since the detection interval from the previous detection to the current detection is shorter than the average value, the output timing is corrected to be delayed by a time corresponding to the difference between the detection interval and the average value. Thus, a shift in detection interval is absorbed and, as a result, pulse signals are output with the predetermined timing such that the outputting is started at the zero-cross point. Accordingly, a desired PAM waveform is generated based on the zero-cross point. In contrast to the above-described case, when the detection interval is longer than the average value, the output timing is corrected to be advanced by a time corresponding to the difference between the detection interval and the average value.

A second aspect of the present invention is directed to an electric power supply circuit including: a rectifier circuit (12), coupled to an alternating current power supply, for rectifying an alternating current; a switching element (S) for causing, when being turned ON, a short-circuit for output power of the rectifier circuit (12); a zero-cross detector section (5a) for detecting a zero-cross point of an input voltage or a point at which the input voltage reaches a level equal to or higher than a predetermined voltage level; and a PAM waveform output section (5c) for outputting, with a predetermined output timing such that the outputting of the pulse signals is started at a time of detection by the zero-cross detector section (5a), a plurality of pulse signals to cause the switching element (S) to perform switching so that a waveform of the input current of the rectifier circuit (12) approximates to a sine wave. An example electric power supply circuit according to the second aspect of the present invention further includes a correction section (5e) for invalidating, when a detection interval from previous detection to current detection by the zero-cross detector section (5a) is equal to or shorter than a predetermined value, the previous detection, and correcting the predetermined output timing for the PAM waveform output section (5c) according to a time difference between a detection interval from detection before previous detection to current detection, and an average value for detection intervals from initial detection to the detection before the previous detection.

According to the second aspect of the present invention, when the zero-cross detector section (5a) detects the zero-cross point itself, pulse signals are output with the predetermined timing such that the outputting of the pulse signals is started at a time of the detection of the zero-cross point. Thus, a desired PAM waveform is generated based on the zero-cross point. Moreover, when the zero-cross detector section (5a) detects the point at which the input voltage reaches a level equal to or higher than a predetermined voltage level, pulse signals are output with the predetermined timing determined in consideration of a time from a time point of the detection to the zero-cross point such that the outputting of the pulse signals is started at a time of the detection of the point at which the input voltage reaches a level equal to or higher than the predetermined voltage level. Thus, as in the above-described case, a desired PAM waveform is generated based on the zero-cross point. Therefore, the waveform of an input current can be reliably caused to be (to approximate to) to a sine wave of the input voltage.

Figure 6:
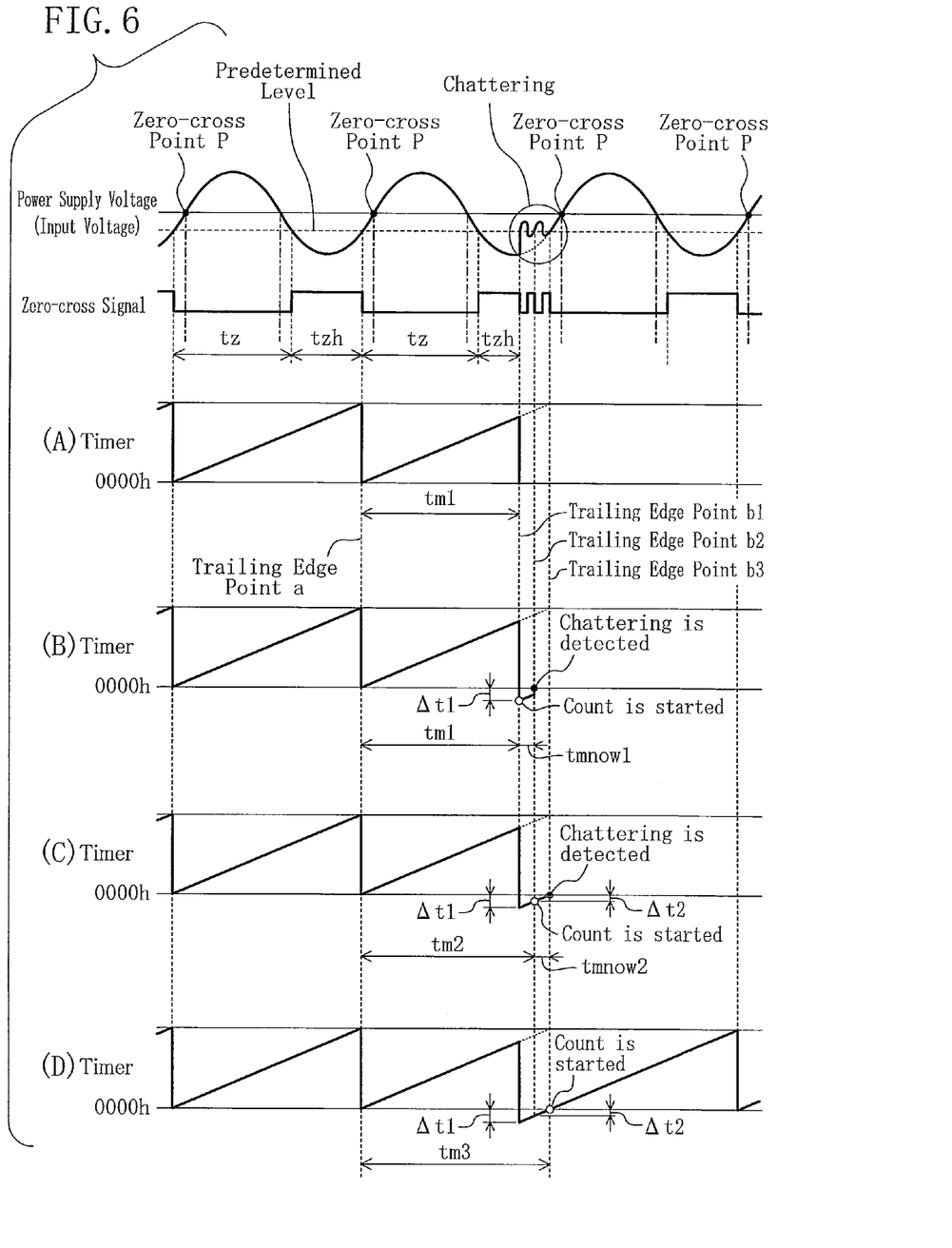
FIG. 6 is a waveform diagram describing a correction operation of correcting an initial value of a timer when chattering occurs.

Now, as shown in FIG. 2, a case where the zero-cross detector section (5a) detects a point at which a voltage reaches a level equal to or higher than a reference level (a predetermined voltage level) will be described. As shown in FIG. 6, when distortion on an input voltage occurs and thus a voltage level exceeds the reference level several times in a short cycle, chattering occurs on the zero-cross signal. Accordingly, the zero-cross detector section (5a) detects the point at which a voltage reaches a level equal to or higher than the reference level each time the input voltage exceeds the reference level. If this state remains unchanged, the PAM waveform output section (5c) outputs a pulse signal many times in a shirt cycle. Accordingly, a desired PAM waveform is not generated, and the waveform of the input current is deformed.

However, according to the second aspect of the present invention, when a detection interval from previous detection to current detection by the zero-cross detector section (5a) is equal to or shorter than a predetermined value, the previous detection is invalidated and pulse signals are output with the predetermined timing such that the outputting is started at a time of the current detection. That is, according to the second aspect, if a detection interval is significantly short, it is determined that chattering has occurred. Furthermore, the predetermined output timing of the PAM waveform is corrected according to a time difference between a detection interval from detection before the previous detection to the current detection, and an average value for detection intervals from initial detection to the detection before the previous detection. That is, because the detection interval from the detection before the previous detection to the current detection is shorter than the average value, the output timing is corrected to be delayed by a time corresponding to the difference between the detection interval and the average value. Thus, a shift in detection interval is absorbed and, as a result, pulse signals are output with the predetermined timing such that the outputting is started at the zero-cross point. Accordingly, a desired PAM waveform is generated based on the zero-cross point.

According to a third aspect of the present invention, in the electric power supply circuit of the first aspect of the present invention, the initial value correction section (5e) invalidates, when a detection interval from current detection to subsequent detection by the zero-cross detector section (5a) is equal to or shorter than a predetermined value, the current detection, and corrects the predetermined output timing to be used at a time of the subsequent detection by the PAM waveform output section (5c) according to a time difference between a detection interval from previous detection to the subsequent detection, and an average value for detection intervals from initial detection to the previous detection.

According to the third aspect of the present invention, not only when distortion occurs on the power supply voltage, but also when chattering occurs on the zero-cross signal, the output timing of the pulse signals can be corrected.

According to a fourth aspect of the present invention, any one of the example electric power supply circuits of the first through third aspects of the present invention includes a timer section (5d) for resetting and starting a count upon each time of detection by the zero-cross detector section (5a). The PAM waveform output section (5c) is configured to output pulse signals with a predetermined output timing using the count of the timer section (5d). Furthermore, the correction section (5e) is configured to correct an initial value of the count of the timer section (5d) according to the time difference.

According to the fourth aspect of the present invention, when a zero-cross point of an input voltage or a point where the input voltage reaches a level equal to or higher than a predetermined voltage level is detected by the zero-cross detector section (5a), the timer section (5d) starts a count. When the zero-cross detector section (5a) detects the zero-cross point of an input voltage or the point where the input voltage reaches a level equal to or higher than the predetermined voltage level, pulse signals are output from the PAM waveform output section (5c) each time the count of the timer section (5d) reaches a predetermined value.

Then, when distortion occurs on the power supply voltage and thus a detection point detected by the zero-cross detector section (5a) is shifted, the initial value of the count of the timer section (5d) is corrected by the correction section (5e). For example, when a detection interval from detection to detection by the zero-cross detector section (5a) is shorter than the average value, the initial value of the timer section (5d) is reduced by a difference between the detection interval and the average value. Accordingly, a time when the count of the timer section (5d) reaches the predetermined value is delayed. Thus, pulse signals are output with the predetermined timing based on the zero-cross point. Therefore, a desired PAM waveform is generated. In contrast, when a detection interval from detection to detection by the zero-cross detector section (5a) is longer than the average value, the initial value of the timer section (5d) is increased by a difference between the detection interval and the average value. Accordingly, a time when the count of the timer section (5d) reaches the predetermined value is advanced. Thus, pulse signals are output with the predetermined timing based on the zero-cross point.

According to a fifth aspect of the present invention, in any one of the electric power supply circuits of the first through fourth aspects of the present invention, the rectifier circuit is a diode bridge circuit (12). The electric power supply circuit of the fifth aspect of the present invention is configured so that the electric power supply circuit is configured so that two capacitors (C1 and C2) coupled in series with each other are provided at an output side of the diode bridge circuit (12), an input side of the diode bridge circuit (12) and a point between the two capacitors (C1 and C2) are coupled via the switching element (S), and thereby, double voltage rectification is performed.

Figure 1:
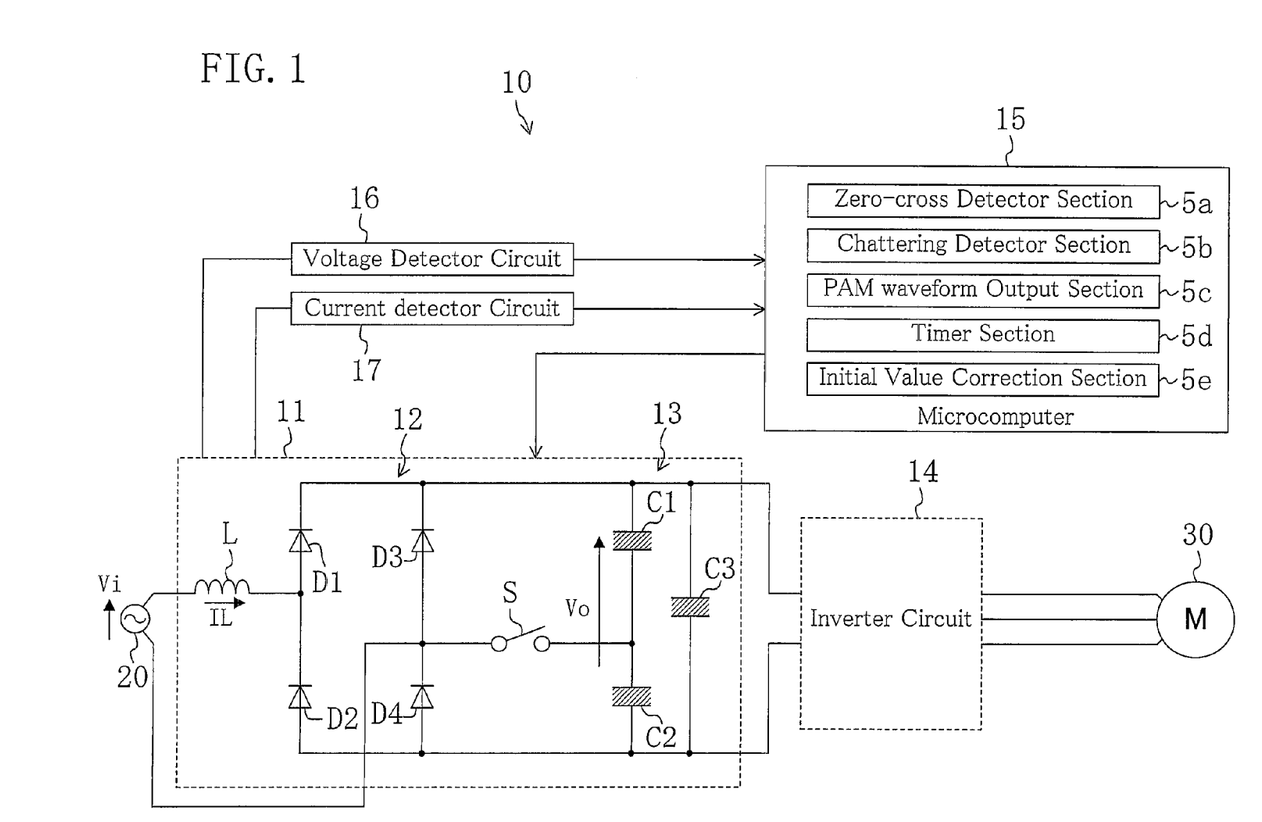
FIG. 1 is a schematic wiring diagram illustrating a configuration of an entire electric power supply circuit according to an embodiment of the present invention.

According to the fifth aspect of the present invention, for example, as shown in FIG. 1, a circuit for performing double voltage rectification is provided. That is, the electric power supply circuit of the fifth aspect of the present invention is configured to be switched to serve as a double voltage rectifier circuit when the switching element (S) is turned ON, and to be switched to serve as a full-wave rectifier circuit when the switching element (S) is turned OFF.

Effects of the Invention

According to the present invention, when a detection point detected by the zero-cross detector section (5a) is shifted due to distortion or chattering on a power supply voltage, a predetermined output timing for the PAM waveform output section (5c) is corrected according to a shift amount. Thus, it is possible to cause the PAM waveform output section (5c) to output pulse signals with a predetermined timing based on the zero-cross point P. Accordingly, a desired PAM waveform can be reliably generated. As a result, a waveform of an input current can be reliably caused to be (to approximate to) a sine wave, so that a high frequency current can be further reduced.

According to the fourth aspect of the invention, when a detection point detected by the zero-cross detector section (5a) is shifted, an initial value of a count of the timer section (5d) is corrected according to a shift amount. Thus, an output timing of a pulse signal by the PAM waveform output section (5c) can be delayed or advanced. Accordingly, a desired PAM waveform can be reliably generated. As described above, it is only necessary to change an initial value of the timer section (5d), and thus, a plurality of predetermined output timings in the PAM waveform output section (5c) do not have to be prepared. That is, according to the present invention, an output timing of a pulse signal can be corrected in a simple manner.

EXPLANATION OF REFERENCE NUMERALS

10 Electric power supply circuit
12 Diode bridge circuit (rectifier circuit)
5a Zero-cross detector section
5c PAM waveform output section
5d Timer section
5e Initial value correction section (correction section)
S Switching element
D1 through D4 Diode
C1, C2 Capacitor

BEST MODE FOR CARRYING OUT THE INVENTION

Hereinafter, embodiments of the present invention will be described in detail with reference to the accompanying drawings.

As shown in FIG. 1, an electric power supply circuit (10) according to this embodiment includes a converter circuit (11), an inverter circuit (14) and a microcomputer (15).

—Configuration of Converter Circuit—

The electric power supply circuit (10) is configured to rectify alternating current power in the converter circuit (11), convert the rectified direct current to a three-phase alternating current in the inverter circuit (14), and supply the three-phase alternating current to an electric motor drive (30). The electric motor drive (30) drives a compressor provided in a refrigerant circuit in an air conditioning system. Although not shown in FIG. 1, the refrigerant circuit of the air conditioning system is configured so that the compressor, a condenser, an expansion mechanism and an evaporator are coupled to form a closed circuit. Thus, a refrigerant circulates in the closed circuit, thereby performing vapor compression refrigeration cycle. In a cooling operation, air cooled by the evaporator is supplied into a room. In a heating operation, air heated by the condenser is supplied into a room.

The converter circuit (11) is coupled to an alternating current power supply (20) to rectify alternating current power. The converter circuit (11) includes a reactor (L) as well as a diode bridge circuit (12) and a smoothing circuit (13).

The diode bridge circuit (12) is coupled to the alternating current power supply (20) and including bridge-connected four diodes (D1 through D4). That is, the diode bridge circuit (12) rectifies alternating current power and serves as a rectifier circuit according to the present invention.

The smoothing circuit (13) is provided at an output side of the diode bridge circuit (12). The smoothing circuit (13) includes two capacitors (C1 and C2) coupled in series with each other, and a capacitor (C3) coupled in parallel to the two capacitors (C and C2). The two capacitors (C1 and C2) coupled in series with each other divides an output voltage (Vo) of the diode bridge circuit (12) so as to cause a current (IC) flow even when an input voltage (Vi) is low. The capacitor (C3) coupled in parallel to the capacitors C1 and C2 smoothes the output voltage (Vo) rectified by the diode bridge circuit (12).

The reactor (L) is coupled between one of electrodes of the alternating current power supply (20) and the diode bridge circuit (12).

The converter circuit (11) includes a switching element (S) capable of switching bidirectionally between ON and OFF. The switching element (S) is coupled between an input side of the diode bridge circuit (12) and a point between the two capacitors coupled in series with each other. That is, the converter circuit (11) of this embodiment is turned to serve as a double voltage rectifier circuit when the switching element (S) is switched ON, and is turned to serve as a full-wave rectifier circuit when the switching element (S) is turned OFF.

The inverter circuit (14) is configured to convert a direct current voltage of the capacitor (C3) to a three-phase alternating current voltage, and supply the three-phase alternating current voltage to the electric motor drive (30). Note that, although not shown, the inverter circuit (14) has a general configuration in which, for example, six switching elements are coupled with one another in the form of a three-phase bridge.

—Configuration of Microcomputer—

The microcomputer (15) performs, in addition to switching control of the inverter circuit (14), PAM (pulse amplitude modulation) control of the converter circuit (11), and serves as a PAM control section according to the present invention. The microcomputer (15) includes a zero-cross detector section (5a), a chattering detector section (5b), a PAM waveform output section (5c), a timer section (5d) and an initial value correction section (5e).

The electric power supply circuit (10) of this embodiment further includes a voltage detector circuit (16) for detecting an input voltage (Vi) of the diode bridge circuit (12), which is a power supply voltage (Vi), and a current detector circuit (17) for detecting an input current (IL) of the diode bridge circuit (12).

As shown in FIG. 2, the zero-cross detector section (5a) is configured to output a zero-cross signal (ON/OFF signal) according to the input voltage (Vi) detected by the voltage detector circuit (16). Specifically, the zero-cross detector section (5a) outputs an ON signal if the input voltage (Vi) is lower than a predetermined level, and is turned OFF if the input voltage (Vi) is equal to or higher than the predetermined level.

The zero-cross detector section (5a) is also configured to calculate (estimate) a location of a zero-cross point P for each cycle of a power supply voltage. The zero-cross point P here is a first zero-cross point after a trailing edge point of a zero-cross signal (ON signal).

Specifically, the zero-cross detector section (5a) calculates a "zero-cross width tz" and a "power supply cycle ts" for each cycle of the power supply voltage. The "zero-cross width tz" is a time from a trailing edge point of a zero-cross signal to a subsequent rising edge point thereof, i.e., a width of an L level (OFF) pulse of the zero-cross signal. The "power supply cycle ts" is a time from a rising edge point of the zero-cross signal to a subsequent rising edge point thereof, i.e., a value of "zero-cross width tz"+"zero-cross width tzh." Note that the "zero-cross width tzh" is a width of an H level (ON) pulse of the zero-cross signal.

The zero-cross detector section (5a) calculates an "average zero-cross width tza" and an "average power supply cycle tsa", respectively, based on the "zero-cross width tz" and the "power supply cycle ts" which have been calculated for each cycle. Specifically, the average values (tza, tsa) are average values obtained by performing a predetermined number (16 times in this embodiment) of calculations for the "zero-cross width tz" and the "power supply cycle ts" up to a previous cycle. The zero-cross detector section (5a) calculates the location tzwav of the zero-cross point P using Formula 1 below.

$$tzwav = (tza/2) - (tsa/4) \qquad \text{[Formula 1]}$$

Thus, a location after a lapse of a time of tzwav since a trailing edge point of the zero-cross signal is estimated to be the zero-cross point P.

The chattering detector section (5b) is configured to detect chattering (i.e., a phenomenon in which a voltage rises and falls in a very short cycle) on a power supply voltage. A specific detection method will be described later.

Figure 3:
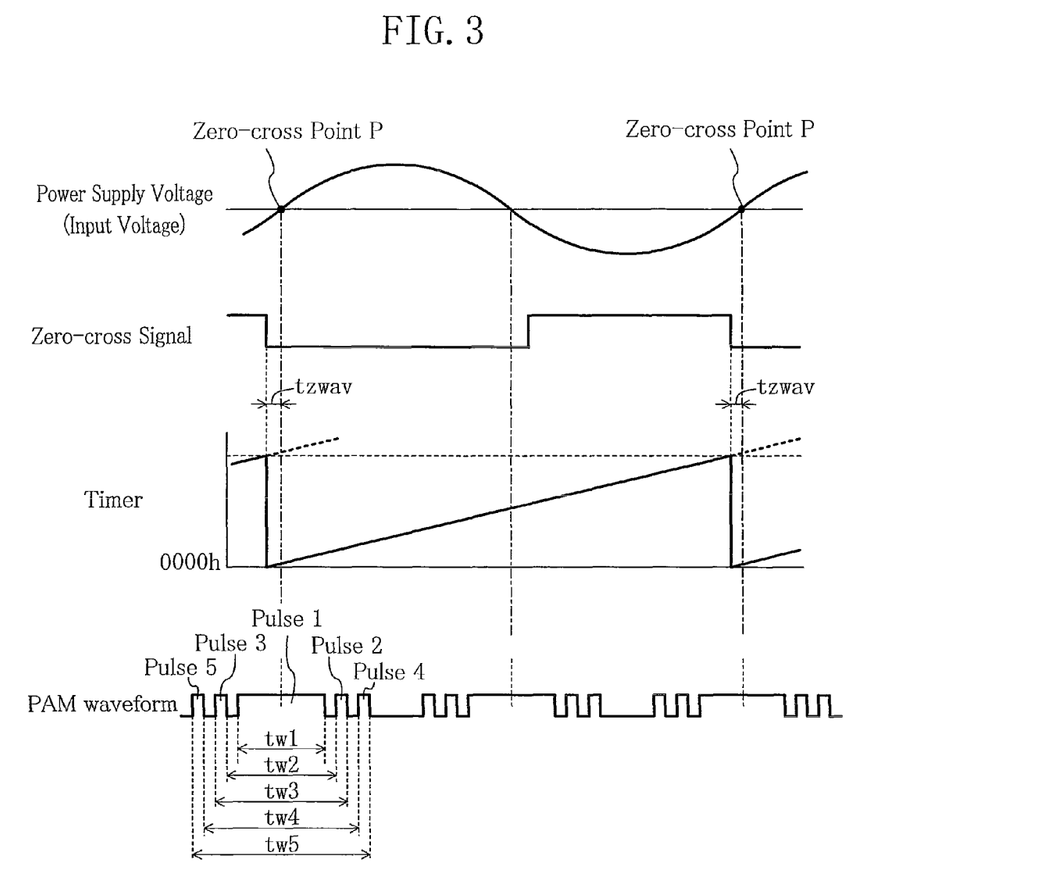
FIG. 3 is a waveform diagram showing an output state of a PAM waveform with respect to a timer count.

As shown in FIG. 3, when a trailing edge point is detected by the zero-cross detector section (5a), a count of the timer section (5d) is started with an initial value of "zero." When a subsequent trailing edge point is detected by the zero-cross detector section (5a), the count is reset and a new count is started. In this manner, the timer section (5d) is reset and starts a new count each time the zero-cross detector section (5a) detects a trailing edge point.

As shown in FIG. 3, the PAM waveform output section (5c) outputs ON/OFF pulses (PAM waveform) which are pulse signals for causing the switching element (S) to perform switching. The PAM waveform output section (5c) outputs the pulse signals (ON/OFF pulses) so that the waveform of the input current is caused to be similar (to approximate) to a waveform of a sine wave of the input voltage. Specifically, the PAM waveform output section (5c) outputs, using the count of the timer section (5d), ON/OFF pulses with a predetermined timing (output timing) each time a trailing edge point is detected by the zero-cross detector section (5a). That is, pulses signals are output with a predetermined timing such that the outputting is started at a trailing edge point of the zero-cross signal in order to generate a desired PAM waveform based on the zero-cross point P.

The PAM waveform output section (5c) outputs pulse signals so that a pulse group consisting of five pulses is generated for each zero-cross point of the power supply voltage. The pulse group is generated so that a center pulse 1 (ON pulse) has a larger width than widths of the other four pulses 2 through 5, and has a symmetrical pattern with respect to the center pulse 1. In the pulse group, as shown in FIG. 3, dimensions tw1 through tw5 are fixed. That is, according to this embodiment, a pulse width of the pulse group is fixed.

The PAM waveform output section (5c) outputs pulse signals so that the center pulse 1 is generated to extend over the zero-cross point P at any time. An output timing for pulse signals is set so that, when a trailing edge point is detected, the PAM waveform output section (5c) outputs an OFF pulse first, and thereafter, alternately outputs ON and OFF pulses. Thus, according to this embodiment, so-called multi-pulse control in which a plurality of pulses (ON pulses) are generated in half cycle of the input voltage is performed.

The initial value correction section (5e) is configured to correct an initial value of the count of the timer section (5d) by an amount corresponding to a shift amount, when distortion on the power supply voltage or chattering on the zero-cross signal occurs and thus a trailing edge point of the zero-cross signal is shifted, i.e., when an estimated location of the zero-cross point P is shifted. Thus, pulse signals of a PAM waveform are output with a predetermined timing such that the outputting is started at the trailing edge point. The initial value correction section (5e) constitutes a correction portion according to the present invention. A specific correction method will be described later.

—Output Operation of PAM Waveform—

Next, a specific operation of outputting a PAM waveform will be described in detail with reference to FIG. 3 though FIG. 6.

First, a normal output operation to be performed where a normal power supply voltage is applied will be described. As shown in FIG. 3, when a trailing edge point of a zero-cross signal is detected by the zero-cross detector section (5a), the timer section (5d) starts a count with an initial value of "zero." Then, pulse signals are output by the PAM waveform output section (5c) with a predetermined timing.

Figure 4:
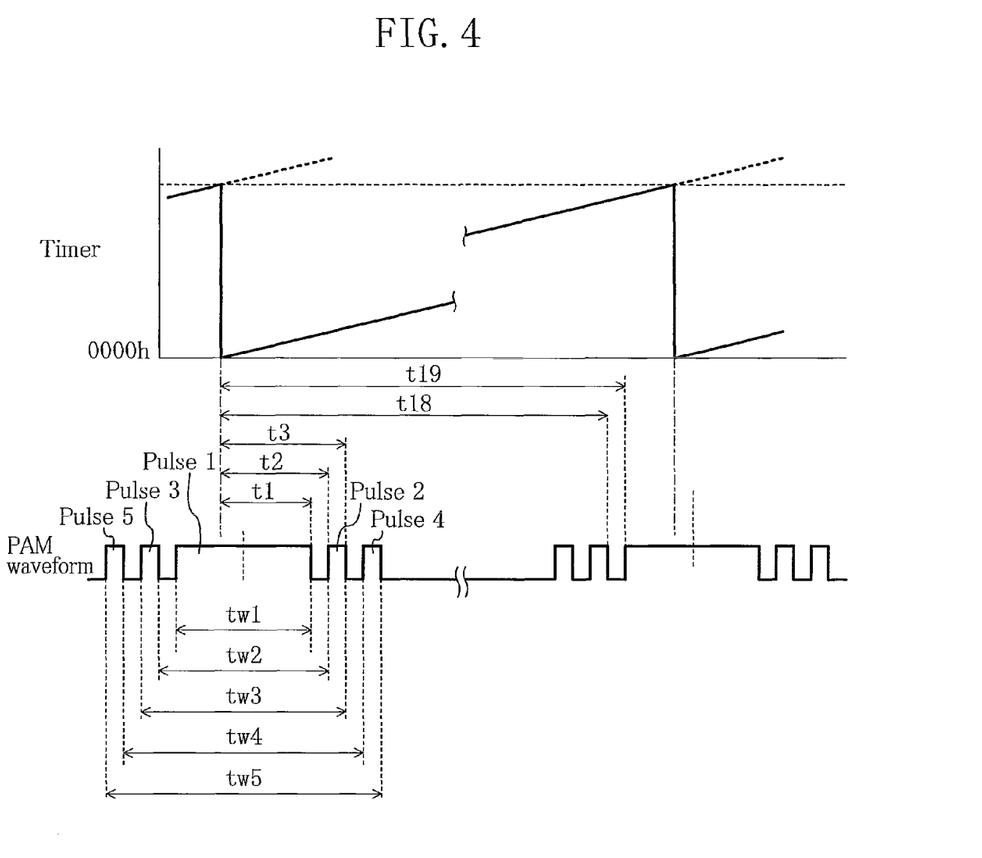
FIG. 4 is a waveform diagram describing an output timing of the PAM waveform.

Specifically, as shown in FIG. 4, when a count of the timer section (5d) is "t1," an OFF pulse is output first. Subsequently, each time the count of the timer section (5d) becomes "t2," "t3," . . . "t18" or "t19," an ON/OFF pulse is output so that ON and OFF pulses alternately appear. Thus, a PAM waveform corresponding to one cycle of an input voltage is output. In consideration of the zero-cross location tzwav calculated by the zero-cross detector section (5a), the count values "t2," "t3," . . . "t18" and "t19" are given so that a desired PAM waveform is output based on the zero-cross point P. Subsequently, when a subsequent trailing edge point of the zero-cross signal is detected, the timer section (5d) is reset and starts a new count with an initial value of "zero." Thus, pulse signals are output at the same count values described above. As described above, a desired PAM waveform can be generated based on the zero-cross point P of the power supply voltage. Accordingly, the waveform of the input current can be caused to be a sine wave, so that a high frequency current can be reduced.

<Output Operation where Voltage Distortion Occurs>

Next, as shown in FIG. 5, an operation of outputting a PAM waveform where distortion on a power supply voltage occurs for some reason and thus a trailing edge point of a zero-cross signal is shifted will be described. Hereinafter, a case where the trailing edge point is shifted to the left as viewed in FIG. 5 (i.e., the trailing edge point is detected earlier) due to the distortion on the power supply voltage will be described.

As shown in FIG. 5, when distortion on the power supply voltage occurs and thus a voltage value reaches a level equal to or higher than a reference level earlier than when a normal power supply voltage is applied, a trailing edge point of the zero-cross signal is shifted to the left. Then, the timer section (5d) is reset, and restarts a new count. In this case, as in the above-described case where a normal power supply voltage is applied, when a count is started with an initial value of "zero," pulse signals are output from the PAM waveform output section (5c) earlier by an amount corresponding to the shift of the trailing edge point to the left. Therefore, a generated PAM waveform is shifted to the left, so that a waveform of an input current is deformed. However, even in such a case, according to this embodiment, the initial value of the count of the timer section (5d) is corrected by the initial value correction section (5e).

The initial value correction section (5e) calculates a time (hereinafter referred to as "work") from a previous trailing edge point to a current trailing edge point for each cycle of the power supply voltage (see works 1 through 3 in FIG. 5). That is, work is also a power supply cycle ts. The initial value correction section (5e) calculates a correction amount Δt for an initial value of the count using Formula 2 below.

$$\Delta t = tsa - \text{work} \quad \text{[Formula 2]}$$

where tsa is an average of the above-described power supply cycle. That is, the initial value correction section (5e) is configured to correct the initial value of the timer section (5d) according to a difference between the current power supply cycle, and the average power supply cycle tsa for the power supply cycles up to the previous power supply cycle.

In this embodiment, "work 2" is substituted for work in Formula 2. Since work 2 is smaller than work when a normal power supply voltage is applied, the correction amount Δt is calculated to be a positive value. Then, the initial value correction section (5e) corrects the initial value of the timer section (5d) from "zero" to "−Δt." Accordingly, a count of the timer section (5d) is started with "−Δt," so that the count reaches predetermined values t1, t2 . . . later than when a normal power supply voltage is applied. Thus, the shift of the trailing edge point is absorbed, and then, a pulse signal having a PAM waveform is output at the zero-cross point P with the same timing as that in a normal case. Therefore, a desired PAM waveform is reliably generated, so that the waveform of the input current remains to be a sine waveform. As described above, in this embodiment, the initial value of the count of the timer section (5d) is corrected, and accordingly, the predetermined output timing of the PAM waveform output section (5c) is corrected.

Note that in contrast to the above, when distortion on the power supply voltage occurs and thus a voltage value reaches a level equal to or higher than a reference level later than when a normal power supply voltage is applied, a trailing edge point of the trailing edge point is shifted to the right as viewed in FIG. 5, and then, work 2 is lager than work when a normal power supply voltage is applied. Accordingly, the correction amount Δt is calculated to be a negative value. In this case, the initial value correction section (5e) corrects the initial value of the timer section (5d) from "zero" to "+Δt." Thus, a count of the timer section (5d) is started with "+Δt," so that the count reaches predetermined values t1, t2 . . . earlier than when a normal power supply is applied. Thus, the same effects as those described above can be achieved.

<Output Operation where Chattering Occurs>

Next, as shown in FIGS. 6(A) through 6(D), an operation of outputting a PAM waveform where chartering on a zero-cross signal occurs due to distortion on a power supply voltage will be described. Hereinafter, a case where a voltage rises and falls with respect to a reference level in a very short cycle will be described.

As shown in FIGS. 6(A) through 6(D), when chattering occurs on the zero-cross signal, the zero-cross signal is repeatedly turned ON and OFF several times (twice in this embodiment) in a shorter cycle than when a normal power supply voltage is applied. That is, after a first trailing edge point b1 is detected, a second trailing edge point b2 and a third trailing edge point b3 are detected in sequence at short intervals.

First, as shown in FIG. 6(A), after a previous trailing edge point a, when the first trailing edge point b1 is detected, a count of the timer section (5d) is reset. Then, an initial value of the count of the timer section (5d) is corrected by the initial value correction section (5e). Specifically, as shown in FIG. 6(B), the initial value correction section (5e) calculates an interval tm1 from the previous trailing edge point a to the trailing edge point b1. Then, the initial value correction section (5e), calculates a correction amount Δt1 of the initial value of the count from the Formula 3 below.

$$\Delta t1 = tsa - tm1 \qquad [\text{Formula 3}]$$

where tsa is an average of the above-described power supply cycle and tm1 corresponds to work in Formula 2. That is, at a time when the first trailing edge point b1 is detected, the initial value of the count is corrected with the same logic as in Formula 2. Thus, the initial value correction section (5e) corrects the initial value of the timer section (5d) from "zero" to "−Δt1." Accordingly, a count of the timer section (5d) is started with "−Δt1" (indicated by an open circle shown in FIG. 6(B)).

Subsequently, as shown in FIG. 6(B), when the second trailing edge point b2 is detected, the count of the timer section (5d) is reset again. Moreover, in the chattering detector section (5b), whether or not the interval tmnow1 from the previous trailing edge point b1 to the current trailing edge point b2 is equal to or shorter than a predetermined value is determined. Then, if tmnow1 is equal to or shorter than the predetermined value, the occurrence of chattering is detected by the chattering detector section (5b). As described above, the chattering detector section (5b) is configured to detect the occurrence of chattering when a detection interval between previous detection and current detection in the zero-cross detector section (5a) is equal to or shorter than a predetermined value. That is, if an ON/OFF cycle of a zero-cross signal is shorter than a normal cycle, the occurrence of chattering is detected.

When the occurrence of chattering is detected, as shown in FIG. 6(C), the initial value correction section (5e) invalidates the detection of the previous trailing edge point b1 by the zero-cross detector section (5a), and then, corrects the initial value of the count of the timer section (5d). Specifically, the initial value correction section (5e) calculates a correction amount Δt2 of the initial value of the count using Formula 4 and Formula 5 below.

$$tm2 = tm1 + tmnow1 \qquad [\text{Formula 4}]$$

$$\Delta t2 = tsa - tm2 \qquad [\text{Formula 5}]$$

where tm2 is an interval between the trailing edge point a before the previous trailing edge point b1 and the current trailing edge point b2. That is, when chattering occurs, the previous edge point is invalidated and a detection interval between the trailing edge point before the previous trailing edge point, and the current trailing edge point is subjected to the operation. In this manner, the initial value correction section (5e) reduces the initial value of the timer section (5d) from "zero" by "−Δt2." Thus, the count of the timer section (5d) is started with "−Δt2" (indicated by an open circle shown in FIG. 6(C)).

Subsequently, as shown in FIG. 6(C), when a third trailing edge point b3 is detected, the count of the timer section (5d) is reset again. Whether or not an interval tmnow2 from the previous trailing edge point b2 to the current trailing edge point b3 is equal to or shorter than the predetermined value is determined. Then, if tmnow2 is equal to or shorter than the predetermined value, the occurrence of chattering is detected by the chattering detector section (5b).

When the occurrence of chattering is detected, as shown in FIG. 6(D), the initial value correction section (5e) invalidates the detection of the previous trailing edge point b2 by the zero-cross detector section (5a), and then, corrects the initial value of the count of the timer section (5d). Specifically, the initial value correction section (5e) calculates a correction amount Δt3 (not shown) of the initial value of the count using Formula 6 and Formula 7 below.

$$tm3 = tm2 + tmnow2 \qquad [\text{Formula 6}]$$

$$\Delta t3 = tsa - tm3 \qquad [\text{Formula 7}]$$

where tm3 is an interval from the trailing edge point a, which is three trailing edge points before the current trailing edge point b3, to the current trailing edge point b3. That is, as in the above-described case, in this case, the previous edge point t2 is invalidated and, as a result, detection of the trailing edge point b1 and detection of the trailing edge point b2 are invalidated. Accordingly, in this case, a detection interval between the trailing edge point, which is three trailing edge points before the current trailing edge point, and the current trailing edge point is subjected to the operation. Then, if tm3 is equal to the average power supply cycle tsa, the correction amount Δt3 is "zero." Thus, the initial value correction section (5e) keeps the initial value of the timer section (5d) at "zero." Accordingly, a count of the timer section (5d) is started with "zero" (indicated by an open circle shown in FIG. 6(D)). Thereafter, a trailing edge point is not detected, and then, the timer section (5d) continues the count.

Based on the above, a time difference between tm1 (tm2 or tm3) and the average power supply cycle tsa is calculated each time chattering is detected, and then, if there is a time difference, the initial value of the timer section (5d) is corrected by an amount corresponding to the time difference. Thus, a trailing edge point at which a time difference between tm1 or the like, and the average power supply cycle tsa is zero is detected, and then, a count can be started at the trailing edge point with the initial value of "zero." Accordingly, pulse signals of a PAM waveform can be output, with the same timing as that when a normal power supply voltage is applied, such that the outputting is started at the zero-cross point P. Therefore, a desired PAM waveform can be reliably generated, so that the waveform of the input current can be maintained to be a sine wave.

—Effects of the Above-Described Embodiment—

According to the above-described embodiment, when a detection point detected by the zero-cross detector section (5a) is shifted from a normal point due to distortion or chattering on a power supply voltage, i.e., when an estimated location of a zero-cross point P is shifted, an initial value of a count of the timer section (5d) is corrected according to a shift amount. Thus, it is possible to cause the PAM waveform output section (5c) to output pulse signals with a predetermined timing based on the zero-cross point P. Accordingly, a desired PAM waveform can be reliably generated. As a result, the waveform of an input current can be reliably caused to be a sine wave, so that a high frequency current can be further reduced.

Other Embodiments

The above-described embodiment may have the following configuration.

For example, according to the above-described embodiment, a correction amount for the initial value of the timer section (5d) is obtained using Formula 2 where a distortion occurs, and, for example, using Formula 5 where chattering occurs. However, the present invention is not limited thereto, but it may be obtained using Formula 8 and Formula 9 below, respectively.

$$\Delta t = (tsa - \text{work}) \times \eta / 100 \quad \text{[Formula 8]}$$

$$\Delta t2 = (tsa - tm2) \times \eta / 100 \quad \text{[Formula 9]}$$

where η is set to be a coefficient which is equal to or smaller than 100, e.g., 98. Thus, the initial value of the timer section (5d) is not corrected at a time but is corrected little by little.

Thus, after the initial value is corrected, for example, even when a power supply voltage with a different cycle is input for some reason, the generation of an excess current and an excess voltage can be suppressed. When the cycle of the power supply voltage fluctuates (i.e., the cycle of the zero-cross point fluctuates), a PAM waveform has to be output according to the cycle. However, if the initial value is corrected at a time, the cycle of the PAM waveform is set to be a normal cycle at once. Therefore, in such a case, when a power supply voltage with a different cycle is input, the cycle greatly differs from the cycle of the PAM waveform, so that an excessive voltage and an excessive current are generated. To cope with this problem, the initial value is corrected little by little. Thus, the cycle of the PAM waveform can be gradually changed, so that a difference between the cycle of the PAM waveform and the cycle of the power supply voltage can be reduced. Therefore, the generation of an excessive current and an excessive voltage can be suppressed.

Moreover, according to the above-described embodiment, a count of the timer section (5d) is started at trailing edge point of a zero-cross signal. However, the present invention is not limited thereto. For example, the zero-cross detector section (5a) may be configured to detect a zero-cross point itself so that a count of timer section (5d) is started at the zero-cross point P.

Furthermore, according to the above-described embodiment, the pulse group generated for each zero-cross point includes five pulses. However, the number of pulses included in the pulse group is not limited thereto, but may be seven or nine. Also, the number of the pulses in the pulse group is not limited to an odd number, but may be an even number.

The above-described embodiment is merely illustrative of the present invention, and there is no intention to limit the scope of the disclosure, products to which the disclosure is applied and its application.

INDUSTRIAL APPLICABILITY

As has been described, the present invention is useful as an electric power supply circuit for performing PAM control to a rectifier circuit, based on a zero-cross point of a voltage.

The invention claimed is:

1. An electric power supply circuit comprising:
   a rectifier circuit, coupled to an alternating current power supply, for rectifying an alternating current;
   a switching element for causing, when being turned ON, a short-circuit for output power of the rectifier circuit;
   a zero-cross detector section for detecting a zero-cross point of an input voltage or a point at which the input voltage reaches a level equal to or higher than a predetermined voltage level;
   a PAM waveform output section for outputting, with a predetermined output timing such that the outputting of the pulse signals is started at a time of detection by the zero-cross detector section, a plurality of pulse signals to cause the switching element to perform switching so that a waveform of the input current of the rectifier circuit approximates to a sine wave; and
   a correction section for invalidating, based on a determination that chattering has occurred on a zero-cross detection signal when a detection interval from previous detection to current detection by the zero-cross detector section is equal to or shorter than a predetermined value, the previous detection, and correcting the predetermined output timing for the PAM waveform output section so that the output timing for the PAM waveform output section is delayed by a time difference between a detection interval from detection before previous detection to current detection, and an average value for detection intervals from initial detection to the detection before the previous detection.

2. The electric power supply circuit of claim 1, further comprising:
   a timer section for resetting and starting a count upon each time of detection by the zero-cross detector section,
   wherein the PAM waveform output section is configured to output pulse signals with a predetermined output timing using the count of the timer section, and
   the correction section is configured to correct an initial value of the count of the timer section according to the time difference.

3. The electric power supply circuit of claim 1, wherein the rectifier circuit is a diode bridge circuit, and
   the electric power supply circuit is configured so that two capacitors coupled in series with each other are provided at an output side of the diode bridge circuit, an input side of the diode bridge circuit and a point between the two capacitors are coupled via the switching element, and thereby, double voltage rectification is performed.

* * * * *